Dec. 6, 1927. Re. 16,809
J. E. LONG
ELECTRIC CIRCUIT CONTROLLING APPARATUS
Original Filed June 7, 1923
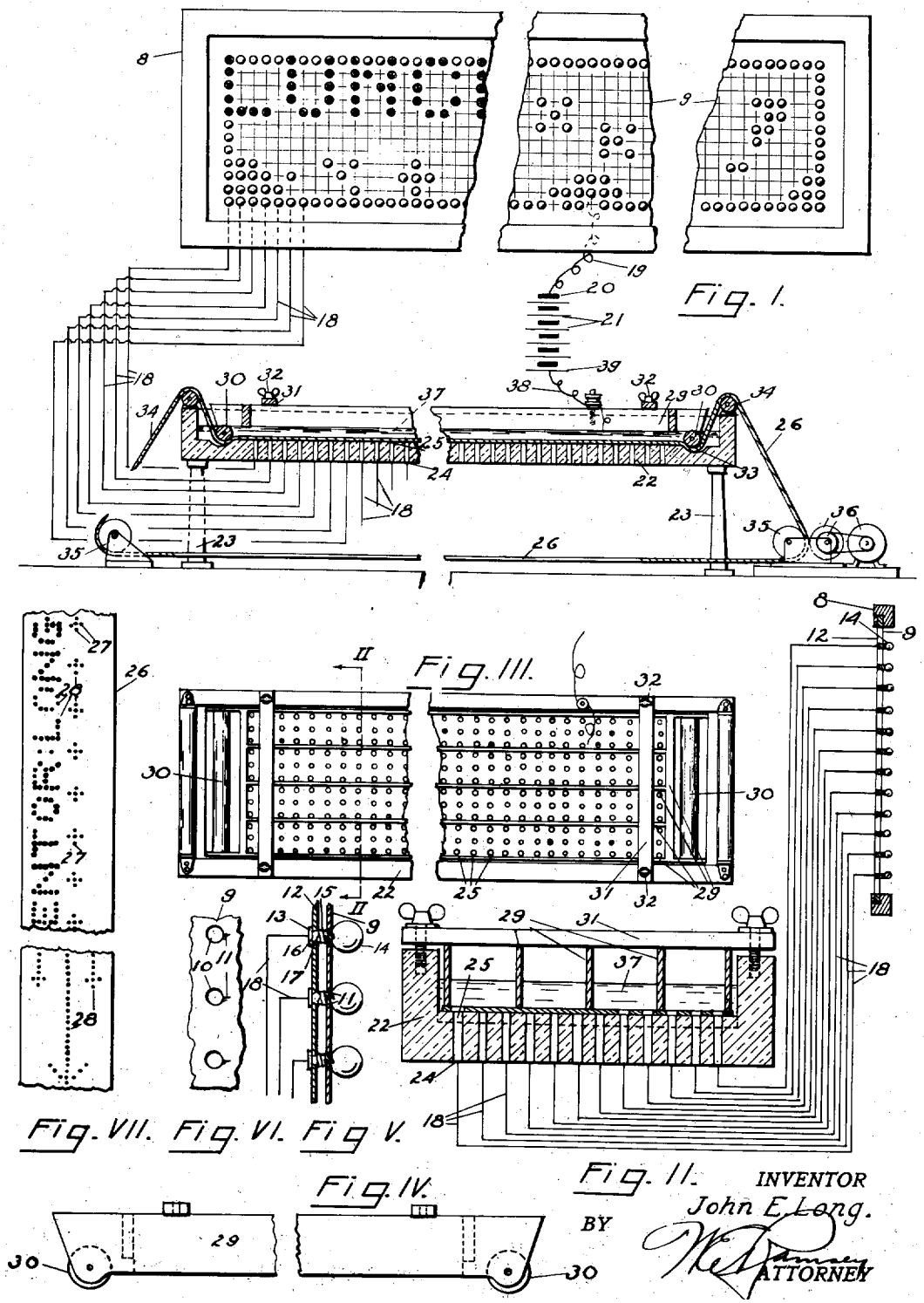
INVENTOR
John E. Long.
BY
ATTORNEY Reissued Dec. 6, 1927.

Re. 16,809

UNITED STATES PATENT OFFICE.

JOHN E. LONG, OF MULTNOMAH, OREGON, ASSIGNOR TO LONG ELECTRIC SIGN COMPANY, OF MULTNOMAH, OREGON, A CORPORATION OF OREGON.

ELECTRIC-CIRCUIT-CONTROLLING APPARATUS.

Original No. 1,573,212, dated February 9, 1926, Serial No. 643,971, filed June 7, 1923. Application for reissue filed April 13, 1927. Serial No. 183,574.

My invention relates to electric circuit controlling apparatus and especially to that type adapted to control a plurality of circuits such for example as the light circuits in an illuminated sign.

The principal object of my invention is to provide a simple and efficient device for utilizing a movable perforated ribbon-like control element of insulating material adapted to be immersed in a bath of mercury or similar liquid and to overlie a series of spaced contacts which except for such control element would be in electrical connection with such bath. Movement of such ribbon-like control element over said contacts brings the perforations in the former into registration with the latter.

One example of the use of my invention is disclosed in the accompanying drawings in which an electric sign comprising a bank of lights is controlled by improved control apparatus in which a bank of terminals, corresponding in number and pattern to the lights on the sign, is arranged upon the horizontal bottom of a mercury filled receptacle. A tape perforated in predetermined design is led across said bottom separating the mercury, which constitutes one terminal in such apparatus, from such bank of terminals in the bottom. When the perforations are arranged in registry with any of the bottom terminals an electrical connection is made thru the corresponding light in the sign and thus the designs formed in the tape are transmitted to the sign.

A further object of my invention is to provide control apparatus of this character in which the tape element does not have to be maintained under substantial tension in order to maintain a fluid tight connection with the spaced contacts.

A further object of my invention is to improve the corresponding devices illustrated in my prior Patent No. 1.394,565, granted October 25, 1921. In such former patent the tracker bar 22, is movable into the bath of mercury constituting one terminal of such controlling means, and must be raised to allow insertion of the breaker tape. It has a curved lower surface which presses the tape into the bath.

In practice it was found necessary to have a large number of electrical conduits extending into this tracker, running as high as from 600 to 1000. This made the cable containing these conduits above the tracker so rigid that the tracker could not be raised to allow the tape to be inserted and then lowered to the bath and it would remain in a rigid, fixed position. It was found impossible to successfully assemble these parts because a large number of wires was absolutely necessary in large signs. This objection was overcome by having all of the terminals fixed in position in the bottom of the receptacle with their ends forming spaced contacts embedded in such bottom and facing the interior of the receptacle.

In the control apparatus shown in my former patent, it is apparent that if there is a slackening of the tape the mercury will flow over it and cause the closing of all of the circuits thus uncovered to destroy the efficient control by such apparatus, and this trouble frequently occurred. In my present improvement the grid provides a close fitting guide with the inner surface of the bottom of the receptacle which aided by the stiffness of the tape prevents the inadvertent uncovering of unregistering contacts even though the tension of the tape is substantially eliminated.

The tracker 22 having a curved surface, requires a substantial degree of tension to be imposed upon the tape to retain it in efficient engagement therewith and such tension causes severe wear upon both the tape and the terminals, and such tension often breaks the tape, requiring its frequent replacement. In my improved device the terminal holding member is plane and the necessary tension to pass under the grid is light and yet the latter is placed in such close proximity to such holding member that it prevents buckling if the tension is substantially diminished, such buckling would permit mercury to pass beneath the tape with the consequences previously noted.

The terminal surface of the tracker is limited to the wetted arc thereof which is immersed in the mercury bath and over which arc the tape functions as a circuit control. In my present improvement, the plane terminal surface may be extended far beyond any possible immersed arc of a curved member, without duplication of such units. The grid will hold the tape in efficient operating position over any desired or convenient length of terminal surface, which is impossible with a curved tracker.

On the tracker 22 the outer terminals must be positioned closer together than at the center thereof, so as to register with the equally spaced perforations in the tape, and such difference in spacing of the terminals requires intricate calculations and thus causes added expense in construction and permits greater possibilities of error. The uniform spacing of the terminals in my improved device permits identical designs to be formed on the control tape and upon the bank of contacts, thus simplifying construction and reducing the cost of construction.

The slight difference in head pressure of the mercury bath upon the tape seemingly causes poor contacts at the outer edges of the tracker which difference in head is eliminated where the terminal surface lies wholly within a plane surface and horizontally.

After exposure to elements a scum forms on the mercury surface and if any portion of the terminal surface is in contact with such scum, poor contacts will result to the detriment of the lighting design of a sign controlled by such device. Arranging the terminals in the bottom of a receptacle in which the pool of mercury overlies such terminals, prevents such undesired result.

The details of construction and operation of my invention are hereinafter described in greater detail with reference to the accompanying drawings, in which:

Fig. I is a front elevation of light frame and sectional elevation of the mercury bath terminal and related parts of the mechanism;

Fig. II is an enlarged cross-section of the mercury terminal and adjacent parts on the line II—II of Fig. III;

Fig. III is a top plan view of the mercury bath terminal and tape guide grid.

Fig. IV is an enlarged side elevation of the tape guide grid with parts broken away.

Fig. V is a sectional elevation of a portion of the lamp terminal plate showing thread means for lamp sockets and connections.

Fig. VI is a plan view of a part of the terminal socket plate.

Fig. VII is a plan view of a portion of the circuit control.

Like characters refer to like parts in all views.

A frame 8 of insulating material and of convenient form and size is provided for the lamp display. The frame may be set up in any place where its illuminated display is desired to be exhibited. Upon the rear of the frame 8 a common terminal and socket plate 9, preferably of copper, is rigidly secured. A bank of socket apertures 10 is arranged with the sockets in quadrilateral positions. Adjacent to each socket the plate is slightly split and the split parts bent outwardly from the plate in opposite directions to form thread ears 11. To the rear of the plate 9 and conveniently spaced therefrom, is a back-board 12 of non-conducting material, rigidly secured and provided with apertures 13 oppositely disposed to the plate sockets 10. Electric lamps 14, of a common type, having a circular threaded terminal 15 and an end terminal 16 are screwed into the sockets 10 until their end terminals 16 extend through the back-board 12. A wire contact metallic plate 17 is secured upon the rear of the back-board over the aperture 13 to receive the lamp terminal 16 in engagement. A conducting wire 18 has one end integrally secured to the plate 17. The same arrangement prevails with the entire series of lamps and wires. A conducting wire 19 has one end integrally secured to the plate 9 and extends therefrom to an integral connection with one terminal 20 of an electrical battery 21.

Below the lamp display part of the apparatus a quadrilateral trough formed receptacle 22 of insulating material is horizontally secured upon standards 23 in rigid position. The bottom of the receptacle 22 of insulating material is horizontally secured upon standards 23 in rigid position. The bottom of the receptacle 22 has apertures 24 arranged in positions related to the lamp terminals 16. The wires 18 leading from the respective lamp terminals 16 extend to and through the related apertures 24 until the opposite ends are flush with the upper surface of the receptacle bottom, and are rigidly secured in this position so that the ends form electrical contacts 25. A perforated tape 26, the width of the receptacle 22 and of non-conducting material, extends in sliding engagement therein over the bottom and outwardly at the opposing ends. The tape has perforations 27 arranged in characters or designs, as for example those illustrated at 28, and in relation to the wire contacts 25 and lamps 14. A grid 29 with rollers 30 at each end is superimposed on the tape 26 and is adjusted by means of clamp bars 31, having securing means 32. The receptacle bottom has grooves 33 at each end, within which the rollers 30 are received. The grid is adjusted to a position which will allow the tape to slide freely between it and snugly over the receptacle bottom and below the rollers 30 in contact with the same, upwardly and over rollers 34, positioned transversely on the opposing ends of the receptacle 22. The tape then extends downwardly about two opposing rollers 35—35′ positioned in a horizontal plane below the receptacle. The tape is a continuous strip. A convenient and suitable power mechanism 36, having power transmitting means to the roller 35 is provided. Within the receptacle 22 is placed a mercury bath 37, which rests upon the tape, retained there by the receptacle walls. The mercury can only engage the contacts 25 of the wires 18 through the perforations 27 of the tape as it is drawn below the bath. A conducting wire 38 has one end integrally connected with the opposing terminal 39 of the battery 21. The opposite end of the wire 38 is pendent in the mercury 37, thus making the mercury the terminal completing the lamp circuits as illustrated.

It will now be apparent that the tape is first perforated with desired characters or designs arranged in a manner to allow the mercury to engage predetermined contacts 25 below the tape and thus complete related circuits, within which are related lamps arranged to reproduce in illuminated form, the design outlined by the tape perforations. It will also be apparent that as the tape progresses through the receptacle, the circuits are closed as soon as the mercury contacts are formed and the entire design is displayed by the lamps in illuminated form when the section of tape comprising the same is wholly below the mercury. In the same manner the design lamps are progressively extinguished as the last perforations in such section pass beyond the receiving end of the receptacle and the unperforated portions of the tape function as a circuit breaker between the mercury and the contacts 25. The grid acts as a guide to retain the tape closely in sliding engagement over the receptacle bottom. As many designs as the tape space permits may be shown consecutively by the continuous tape, which is drawn along in the manner described by some suitable motive mechanism. The arrangement of the common terminal plate does away with a mass of circuit part wires which would otherwise be required to connect the lamp terminals 15 separately with the battery terminal 20. The split ears next the plate sockets form a simple and efficient means to secure the lamps in the sockets and insure the connections. It will also be seen that the only movable part in the entire apparatus is the tape circuit control carrying the designs, hence when set up there should be nothing to get out of order.

As is shown diagrammatically in Fig. 11, the tape is relatively stiff and lays flat upon the bottom of the receptacle even though held by the spaced pendent portions of the grid 29. I have discovered that stiff paper suits the purpose admirably and has no attraction for the mercury bath. By using material of this character and holding the same flat upon the bottom of the receptacle by the use of the grid 29, only a slight degree of tension must be sustained by the tape.

The movement of the tape is very light and easy. The mercury adjusts itself for connections without disturbance to any other parts, and the wires remain fast with good contacts. The tape constitutes a most practical circuit controlling means and the apparatus in a model has been demonstrated to function with accuracy for the purposes intended. If it should be desired to have an entire design on a tape section illuminated instantaneously this can be done by a perforation near the margin of the tape to close all the design lamp circuits when the section is wholly within the receptacle. This would operate as a master control for circuit breaking and closing. The device is comparatively simple in construction, can be cheaply manufactured, and is essentially new and useful.

I claim:

1. In an electric sign, a receptacle of insulating material having a horizontal bottom, conducting wires extending through the receptacle, their ends forming terminals flush with the inner bottom surface of the receptacle, a bath of electricaly conducting liquid in the receptacle, and a tape of nonconducting material adapted to be drawn in sliding engagement over the bottom surface of the receptacle and over said wire terminals, the tape having a plurality of apertures therein arranged to allow the circuit between the wire terminals and liquid terminal to be closed as the apertures register with the wire terminals and the circuit to be broken as the apertures are drawn from registry, the apertures being arranged in a predetermined manner with relation to each other for said purpose.

2. In an electric sign, a receptacle of insulating material having a horizontal bottom, conducting wires extending through the receptacle, their ends forming terminals flush with the inner bottom surface of the receptacle, a bath of electrically conducting liquid in the receptacle, a tape of non-conducting material adapted to be drawn in sliding engagement over the bottom surface of the receptacle and over said wire terminals, the tape having a plurality of apertures therein arranged to allow the circuit between the wire terminals and liquid terminal to be closed as the apertures register with the wire terminals and the circuit to be broken as the apertures are drawn from registry, the apertures being arranged in a predetermined manner with relation to each other for said purpose, and a grid, adjustable to and securable in a position parallel with the receptacle bottom above said tape for its sliding engagement with the grid and to allow the tape to be drawn over the wire terminals as mentioned.

3. In an electric sign, a receptacle of insulating material having a horizontal bottom, conducting wires extending through the receptacle, their ends forming terminals flush with the inner bottom surface of the receptacle, a bath of electrically conducting liquid in the receptacle, a tape of nonconducting material adapted to be drawn in sliding engagement over the bottom surface of the receptacle and over said wire terminals, the tape having a plurality of apertures therein arranged to allow the circuit between the wire terminals and liquid terminals to be closed as the apertures register with the wire terminals and the circuit to be broken as the apertures are drawn from registry, the apertures being arranged in a predetermined manner with relation to each other for said purpose, a grid, adjustable to and securable in a position parallel with the receptacle bottom above said tape for its sliding engagement with the grid and to allow the tape to be drawn over the wire terminals as mentioned, and mechanism arranged and adapted to draw said tape through the receptacle along said course described and for the purpose mentioned.

4. In an electric sign, a receptacle of insulating material having a horizontal bottom, conducting wires extending through the receptacle, their ends forming terminals flush with the inner bottom surface of the receptacle, a bath of electrically conducting liquid in the receptacle, a battery cell, a conducting wire extending from said liquid to one terminal of said cell, a second wire extending from the opposing terminal of the cell to an intermediate connection with the opposing terminals of said receptacle wires, and a tape of non-conducting material adapted to be drawn in sliding engagement over the bottom surface of the receptacle and over said wire terminals, the tape having a plurality of apertures therein arranged to allow the circuit between the wire terminals and liquid terminal to be closed as the apertures register with the wire terminals and the circuit to be broken as the apertures are drawn from registry, the apertures being arranged in a predetermined manner with relation to each other for said purpose.

5. In an electric circuit controlling apparatus of the character described, a receptacle, such receptacle adapted to contain a bath of electrically conducting liquid of the character described in the receptacle, having an insulated terminal embedded in the inner surface thereof and lying below the surface of such bath and a tape of non-conducting material adapted to be drawn in sliding engagement over said surface of the receptacle and over said terminal, the tape having an aperture therein arrangd to allow electrical contact between the terminal and the liquid as the aperture comes into registry with the former, and electrical disengagement as the aperture is moved from registry.

6. In an electric circuit controlling apparatus of the character described, a receptacle having a bottom of insulating material, terminals embedded in the inner bottom surface of the receptacle, such receptacle adapted to contain a bath of electrically conducting liquid of the character described, and a tape of non-conducting material adapted to be drawn in sliding engagement over the surface of the receptacle and over said terminals, the tape having a plurality of apertures therein arranged to allow electrical contact between the terminals and liquid as the apertures come into registry with the terminals, and electrical disengagement as the apertures are moved from registry, the apertures being arranged in a predetermined manner with relation to each other, for the purpose described, and a grid arranged so that its bottom surface assumes parallelism with the receptacle bottom and is spaced therefrom a distance sufficient only to permit the tape to be drawn between such two members.

7. In an electric circuit controlling apparatus of the character described, a receptacle adapted to contain electrically conductive liquid and having a wall section of insulating material, terminals embedded in the inner surface of such receptacle section below such liquid and a tape of non-conducting material adapted to be drawn in sliding engagement over such surface of the receptacle and over said terminals, means for producing such motion of the tape, the tape having a plurality of apertures therein arranged to allow electrical contact between the terminals and liquid as the apertures come into registry with the terminals, and electrical disengagement as the apertures are moved from registry, the apertures being arranged in a predetermined manner with relation to each other, for the purpose described, and a guide element for holding such tape in sliding engagement with the bottom of such receptacle.

8. In an electric circuit controlling apparatus of the character described, a source of electrical energy, a receptacle having a wall section of insulating material, conductors connected to such source, ending in terminals embedded in the inner surface of such section, a bath of electrically conducting liquid in the receptacle covering such section, a return conduit connecting such bath to such source, a tape of non-conducting material adapted to be drawn in sliding engagement over such surface of the receptacle and over the terminals, the tape having a plurality of apertures therein arranged to allow the circuits to be closed as the apertures come into registry with the terminals, and to be broken as the apertures are moved from registry, the apertures being arranged in a predetermined manner with relation to each other, for the purpose described.

9. In an electric circuit controlling apparatus of the character described, a receptacle having a wall section of insulating material, spaced terminals embedded in the inner surface of such section, such latter surface constituting a guide for a perforated sheet of non-conducting material adapted to be drawn in sliding engagement with such surface and across such spaced terminals, and such receptacle being adapted to contain a bath of an electrically conducting liquid covering such terminals but separated therefrom by such sheet of non-conducting material.

10. In an electric circuit controlling apparatus of the character described, a receptacle having a non-conducting bottom portion in which a terminal is embedded facing the interior of said receptacle, the interior surface of such bottom portion extending substantially in a horizontal plane, such receptacle being adapted to contain a body of an electrically conducting liquid of the character described overlying such terminal and a sheet of non-conducting material arranged in slidable engagement with such interior surface of such receptacle bottom thereby to separate such terminal from such overlying body of liquid.

11. In an electric circuit controlling apparatus of the character described, a receptacle having a non-conducting bottom portion in which a terminal is embedded facing the interior of said receptacle, the interior surface of such bottom portion extending substantially in a horizontal plane, such receptacle being adapted to contain a body of an electrically conducting liquid of the character described overlying such terminal and a sheet of non-conducting material arranged in slidable engagement with such interior surface of such receptacle bottom thereby to separate such terminal from such overlying body of liquid, a guiding element extending over such terminal but spaced sufficiently therefrom to define a path for such sheet of non-conducting material.

12. In an electric circuit controlling apparatus of the character described, a receptacle having a non-conducting bottom portion in which a terminal is embedded facing the interior of said receptacle, the interior surface of such bottom portion extending substantially in a horizontal plane, such receptacle being adapted to contain a body of an electrically conducting liquid of the character described overlying such terminal and a sheet of non-conducting material arranged in slidable engagement with such interior surface of such receptacle bottom thereby to separate such terminal from such overlying body of liquid, a grid mounted within said receptacle and having a guiding portion extending over such terminal but spaced sufficiently therefrom to define a path for such sheet of non-conducting material.

13. In an electric circuit controlling apparatus of the character described, a receptacle having a non-conducting bottom portion in which a terminal is embedded facing the interior of said receptacle, the interior surface of such bottom portion extending substantially in a horizontal plane, such receptacle being adapted to contain a body of an electrically conducting liquid of the character described overlying such terminal and a sheet of non-conducting material arranged in slidable engagement with such interior surface of such receptacle bottom thereby to separate such terminal from such overlying body of liquid, such combination together with guiding elements arranged at the ends of the bottom of the receptacle, and extending below the plane of the latter, but spaced therefrom.

14. In an electric circuit controlling apparatus of the character described, a receptacle having a non-conducting bottom portion in which a terminal is embedded facing the interior of said receptacle, the interior surface of such bottom portion extending substantially in a horizontal plane, such receptacle being adapted to contain a body of an electrically conducting liquid of the character described overlying such terminal and a sheet of non-conducting material arranged in slidable engagement with such interior surface of such receptacle bottom thereby to separate such terminal from such overlying body of liquid, such combination together with guiding rollers arranged at the ends of the bottom of the receptacle, and extending below the plane of the latter, but spaced therefrom.

15. In an electric circuit controlling apparatus of the character described, a receptacle having a non-conducting bottom portion in which a terminal is embedded facing the interior of said receptacle, the interior surface of such bottom portion extending substantially in a horizontal plane, such receptacle being adapted to contain a body of an electrically conducting liquid of the character described overlying such terminal and a sheet of non-conducting material arranged in slidable engagement with such interior surface of such receptacle bottom thereby to separate such terminal from such overlying body of liquid, such combination together with a grid mounted within said receptacle and having a guiding portion extending over such terminal but spaced sufficiently therefrom to define a path for such sheet of nonconducting material, and a guiding element carried at each end of such grid, such guiding elements extending below the plane of the bottom of the receptacle, but spaced therefrom.

16. In an electric circuit controlling apparatus of the character described, a receptacle having a non-conducting bottom portion in which a terminal is embedded facing the interior of said receptacle, the interior surface of such bottom portion extending substantially in a horizontal plane, a body of an electrically conducting liquid of the character described overlying such terminal, a sheet of non-conducting material arranged in slidable engagement with such interior surface of such receptacle bottom and means for moving the latter thereby separating such terminal from such overlying body of liquid.

17. In an electric circuit controlling apparatus of the character described, a receptacle having a non-conducting bottom portion in which a plurality of spaced terminals are embedded facing the interior of said receptacle, the interior surface of such bottom portion extending substantially in a horizontal plane, a body of an electrically conducting liquid of the character described overlying all of such terminals, a sheet of non-conducting material arranged in slidable engagement with such interior surface of such receptacle bottom and means for moving the latter, thereby separating such terminals from such overlying body of liquid, a grid mounted within said receptacle and having a guiding portion extending over such terminals but spaced sufficiently therefrom to define a path for such sheet of non-conducting material, guiding elements carried by such grid and arranged at the ends of the bottom of the receptacle, and extending below the plane of the latter, but spaced therefrom, such sheet having perforated designs formed therein, the perforations being spaced and arranged to register with the contact terminals.

JOHN E. LONG.